UNITED STATES PATENT OFFICE.

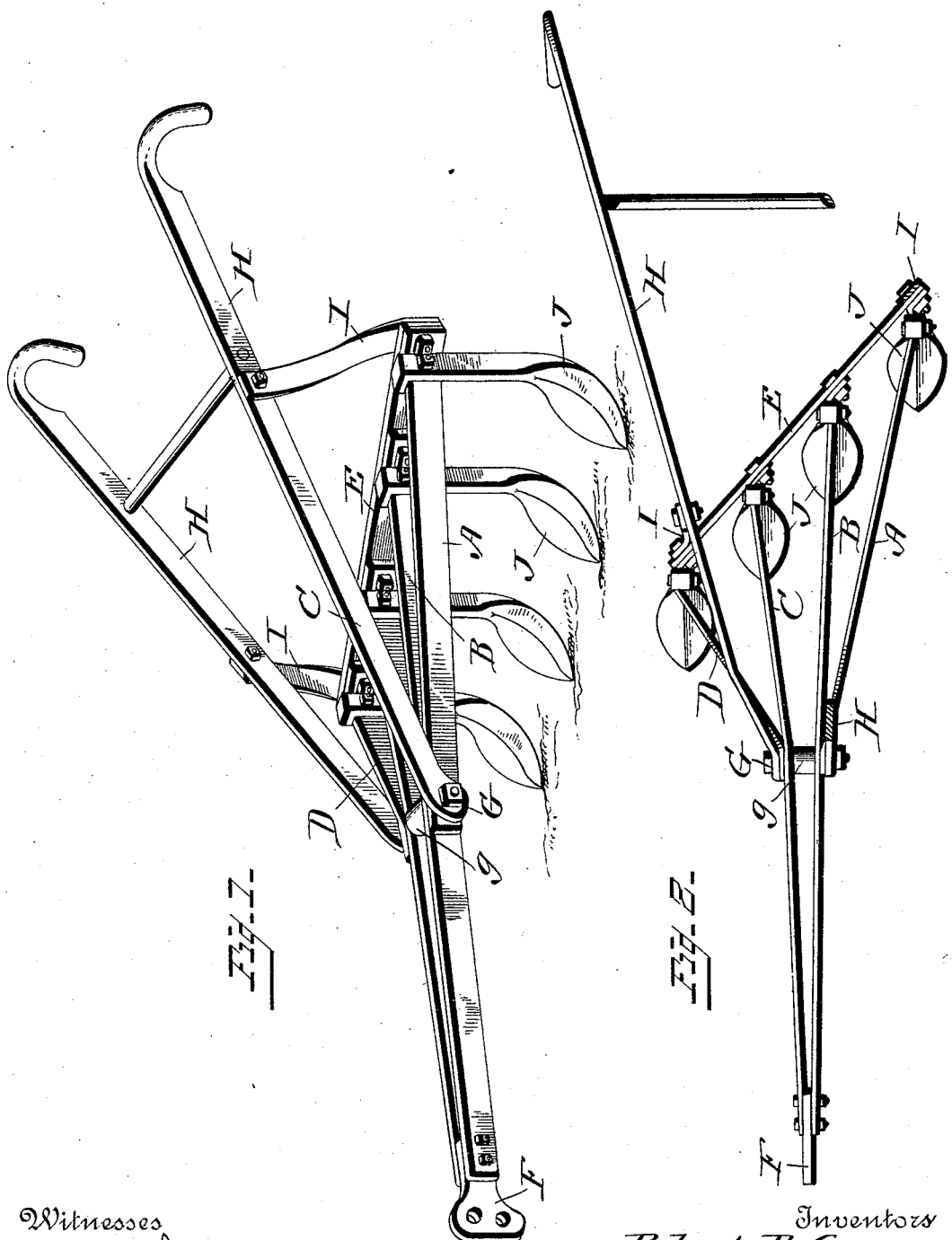

ROBERT BRUCE GRAVES AND DANIEL FRANKLIN MERRITT, OF ELLISVILLE DEPOT, MISSISSIPPI.

HARROW.

SPECIFICATION forming part of Letters Patent No. 478,960, dated July 12, 1892.

Application filed September 17, 1891. Serial No. 406,003. (No model.)

*To all whom it may concern:*

Be it known that we, ROBERT BRUCE GRAVES and DANIEL FRANKLIN MERRITT, citizens of the United States, residing at Ellisville Depot, in the county of Jones and State of Mississippi, have invented certain new and useful Improvements in Harrows; and we do hereby declare the following to be a full, clear, and exact description of the invention, such as will enable others skilled in the art to which it appertains to make and use the same.

This invention relates to harrows which employ metal solely in their construction and which have the cultivating-teeth arranged obliquely to the line of draft.

The improvement consists of the novel features and the peculiar construction and combination of the parts, which will be hereinafter more fully described and claimed, and which are shown in the annexed drawings, in which—

Figure 1 is a perspective view of a harrow embodying our invention. Fig. 2 is a top plan view of the harrow, the handles and the handle-braces being shown in section and in their relative positions.

The frame of the harrow is composed of a series of flat metal bars A, B, C, and D, which are set with the edge or wide side in a vertical direction. The oblique bar E is secured to the rear ends of the frame-bars A, B, C, and D by bolts, which pass through the bar E and the bent ends of the said frame-bars, which ends are fitted snugly against the said bar E, as shown. The middle bars B and C are projected forward a sufficient distance to form a beam, and the clevis F is secured between the front ends of the said bars B and C. The bolt G secures together the bars A, B, C, and D, the spacing-block $g$ on the bolt and between the bars B and C bracing the said latter bars. The handles H are secured at their front ends to the frame-bars by the bolt G, the latter passing through the same, and are braced and strengthened by the braces I, which latter are secured to the bar E by the same bolts which secure the frame-bars A and D to the said bar E. The teeth J have their upper ends bent to overlap the edge of the frame-bars and are secured to the said frame-bars by a single bolt each. The frame-bars, near their bent ends, are deflected slightly, as shown, to give the proper set to the teeth. The rear edges of the teeth, near their upper ends, bear against one edge of the bolts which secure the frame-bars to the bar E and form a lock to prevent the same from turning. Moreover, the contact of the said teeth with the said bolts braces the teeth.

It will be observed that the frame-bars diverge from the bolts G from front to rear and that the said bolt G secures the handles and the frame-bars together.

Having thus described our invention, what we claim, and desire to secure by Letters Patent, is—

The hereinbefore shown and described harrow, composed of the frame-bars A, B, C, and D, diverging from front to rear, the bars B and C being extended forward to form a beam and having the clevis secured between their front ends, the rear ends of the said bars being bent, the oblique bar E, bolted to the bent ends of the said bars, the teeth having their upper ends bent to overlap the edge of the frame-bars to which they are bolted, the rear edges of the said teeth touching the bolts which secure the frame-bars and the bar E together, the handles, the bolt G, securing the handles and the frame-bars together, substantially in the manner shown, and the braces I, between the handles and the frame and secured to the bar E by the same bolts which secure the frame-bars A and D thereto, substantially as set forth.

In testimony whereof we affix our signatures in presence of two witnesses.

ROBERT BRUCE GRAVES.
DANIEL FRANKLIN MERRITT.

Witnesses:
J. W. QUICK,
A. MALONE.